United States Patent [19]
Cain et al.

[11] Patent Number: 5,197,821
[45] Date of Patent: Mar. 30, 1993

[54] LIGHTWEIGHT, RAPID DEPLOYMENT OIL SPILL CONTAINMENT BOOM

[75] Inventors: Richard E. Cain, Santa Ana; Nathan B. Jones, Long Beach, both of Calif.

[73] Assignee: Spill Management, Inc., Stanton, Calif.

[21] Appl. No.: 746,313

[22] Filed: Aug. 16, 1991

[51] Int. Cl.⁵ ............................................. E02B 15/04
[52] U.S. Cl. ...................................... 405/68; 405/63; 405/66
[58] Field of Search ...................................... 405/63–72; 210/923

[56] References Cited

U.S. PATENT DOCUMENTS

| | | | |
|---|---|---|---|
| 2,682,151 | 6/1954 | Simpson et al. | 405/68 |
| 3,563,036 | 2/1971 | Smith et al. | 405/69 |
| 3,592,006 | 7/1971 | Crucet | 405/66 |
| 3,701,259 | 10/1972 | Heartness | 405/69 |
| 4,300,856 | 11/1981 | Magoon et al. | 405/66 |
| 5,040,918 | 8/1991 | Taricco | 405/66 |

Primary Examiner—Dennis L. Taylor
Attorney, Agent, or Firm—Daniel L. Dawes

[57] ABSTRACT

An emergency, lightweight marine containment system is comprised of a containment crate in which is flatly accordion folded an uninflated boom curtain. The boom curtain is comprised of a self-inflating flotation chamber on one longitudinal edge with an integral depending curtain terminating in a self-inflating ballast chamber on the opposing longitudinal edge. The flotation chamber is inflated by gas and the ballast chamber is inflated by the water or sea water into which the boom curtain is disposed. The boom curtain is made of lightweight single-ply or multiple-ply sheet material.

10 Claims, 4 Drawing Sheets

LIGHTWEIGHT, RAPID DEPLOYMENT OIL SPILL CONTAINMENT BOOM

BACKGROUND OF THE INVENTION

1. Field of the Invention

The invention relates to the field of oil or chemical containment booms and in particular to an improved boom construction and method of deployment wherein a lightweight boom may be stored and deployed as an emergency containment boom either by aircraft, helicopter or by light duty water craft.

2. Description of the Prior Art

Energy usage, and in particular oil production, requires the production of crude petroleum at offshore platforms or the transport of substantial volumes of oil or other petroleum products by super tankers on the sea lanes. In addition, intentional oil spills have been used in the Middle East as a weapon of war. The impact both upon environment, wildlife, fisheries, and machines of both peace and war, which operate in the marine environment or in coastal environments, are adversely impacted by marine petroleum spills sometimes with catastrophic losses. It is further anticipated that intentional environmental despoiliation may in the future not be limited to petroleum spills, but may also include spills of adverse chemical and biological agents.

Use of inflatable oil containment booms is well known. Such booms may be comprised of multiple inflated chambers such as shown by Bretherick et al, "Barrier For Oil Spilt On Water," U.S. Pat. No. 4,140,424 (1979); or Finigan et al, "Oil Control System," U.S. Pat. No. 4,123,911 (1978).

The basic design for oil spill containment booms includes a top flotation device, which is solid or air inflated, from which depends a curtain held by weights. In this manner, when the boom is deployed in a rolling sea or chop, the integrity of the barrier is maintained even though a section of the flotation chamber is lifted out of the water by wave crests. Examples of such design range from a simple flat inflatable boom such as shown by Kurihara et al, "Oil Boom," U.S. Pat. No. 4,260,285 (1981) to more complex systems such as shown by Teasdale, "Oil Containment Booms," U.S. Pat. No. 4,403,888 (1983); Ahiko, "Floatable Oil Fence," U.S. Pat. No. 4,015,431 (1977); Simpson et al, "Containment Boom System," U.S. Pat. No. 4,640,645 (1987); or Hallhagen, "Oil Fence," U.S. Pat. No. 4,084,380 (1978).

However, most if not all prior art containment boom systems are heavy weight structures intended for permanent or semi-permanent deployment and designed to provide prolonged service even in heavy seas. See for example Preus, "Inflatable Barrier," U.S. Pat. No. 4,104,884 (1978); Grihangne, "Floating Marine Barrage," U.S. Pat. No. 3,922,861 (1975); Vidilles, "Floating Containment Vessels or Dams for Trapping Liquid Pollutants," U.S. Pat. No. 3,922,862 (1975); and Ballu, "Floating Anti-Pollution Barrier and Method for Using the Same," U.S. Pat. No. 4,244,819 (1981).

Virtually, all of these systems are relatively heavy, typically weighing in excess of 5 lbs./ft. and expensive to manufacture, typically costing in excess of $50/ft. In addition their storage and deployment is cumbersome, often requiring, if not specialized skills, specialized or heavy duty equipment, such as shown by the Trawler mounted inflation deployment device by Finigan, supra.

Because of the cost of such equipment, its cumbersomeness, weight and the special equipment or skills needed to deploy it, it is often the case that many hours if not several days are required before the oil containment equipment and personnel can arrive at the site of the oil spill to prevent further damage. In the meantime, the severity of the spill often increases or spreads such that substantial damage has already been incurred prior to the first possibility of any limitation. In many cases, the amount of damage could be substantially minimized or even trivialized if some means were available for on-the-spot containment at the instant of the spill.

Therefore, what is needed is an oil or pollution containment system which is light, easily deployable with light equipment and minimal personnel needs and which can be quickly provided to or carried by each vessel or delivered to the site where the spills occurs.

BRIEF SUMMARY OF THE INVENTION

The invention is a lightweight boom curtain contained in a special marine crate. The boom curtain comprises a lightweight flotation chamber extending to form a depending curtain and terminating in a sea-filled ballast chamber wherein the flotation chamber, depending curtain and ballast chamber are formed from a single ply of lightweight oil resistant sheet material. A containment or crate is provided to store and deploy the boom curtain. The boom curtain is accordionfolded flatly within the crate. As a result, the marine crate system is lightweight, compact and readily deployed with a minimum of equipment and personnel.

The marine containment system further comprises an inflation mechanism for either manually or self-inflating the flotation chamber upon deployment of the boom curtain. The self-inflation mechanism comprises a compressed gas assembly communicated with the flotation chamber and triggered upon deployment of the boom curtain from the crate.

The self-inflation mechanism comprises a valve, a compressed gas bottle, a pull pin to open the valve, and mechanism for drawing the pull pin from the valve upon the deployment from the crate.

The crate is a rigid container and the mechanism for drawing the pin is a cable connected between the pull pin and the rigid container such that removal of the boom curtain from the container draws the pull pin from the valve.

The inflation mechanism further comprises an air valve adapted for inflation by an external air pump, which may include a portable air fan blower system.

The flotation chamber is segmented into a plurality of separate airtight chambers. Each separate airtight chamber is separately inflated by a separate source of gas pressure.

The ballast chamber is self-inflating with water. The self-inflating ballast chamber has an interior and comprises a plurality of holes defined in the ballast chamber for communicating the interior of the ballast chamber with exterior water environment. A mechanism is included for displacing opposing side walls of the ballast chamber apart when the boom curtain is deployed in water.

The marine containment system further comprises a mechanism coupled to the boom curtain for deploying the boom curtain from aircraft, helicopters, ships or from light inflatable sea craft.

The boom curtain may be comprised of a plurality of segments of boom curtains and a coupling mechanism for coupling each of the segments together end-to-end.

The coupling mechanism is universal so that the segments may be coupled to each other end-to-end without preference to order of the ends of the segments.

The marine containment system further comprises a mechanism for rapid deflation of the flotation chamber of the boom curtain to allow recovery and refolding of the boom curtain.

The invention is also characterized as a method for rapid deployment of a spill containment boom comprising the steps of storing a lightweight, flatly folded, boom curtain within a compact crate adapted for ease of storage and transport. The crate is then opened for deployment of the boom curtain. A mechanism for applying a deploying force on one end of the boom is then attached. The boom curtain is pulled from the crate by the mechanism while the boom curtain is simultaneously inflated so that the spill containment boom is rapidly deployed by air or sea by application only of the force developed by the mechanism for deploying. The mechanism for deploying applies force needed to draw and unfold the boom curtain from the crate.

The invention can be better visualized by now turning to the following drawings wherein like elements are referenced by like numerals.

The invention and its various embodiments may now be better understood by turning to the following detailed description.

DETAILED DESCRIPTION OF PREFERRED EMBODIMENTS

An emergency, lightweight marine containment system is comprised of a containment crate in which is flatly accordion folded an uninflated boom curtain. The boom curtain is comprised of a either manual or self-inflating flotation chamber on one longitudinal edge with an integral depending curtain terminating in a self-inflating ballast chamber on the opposing longitudinal edge. The flotation chamber is inflated by gas and the ballast chamber is inflated by the water or sea water into which the boom curtain is disposed. The boom curtain is made of lightweight single-ply or multiple-ply oil resistant sheet material.

The lightweight oil containment boom is constructed of single-ply or multiple-ply plastic such as 0.020–0.030" thick oil resistant and ultra-violet resistant rubber or plastic or other synthetic sheet material. In the preferred embodiment, illustrated in the Figures below, the total weight of the boom system per foot is 1.0–1.5 lb/lineal foot or less. As will be described below, up to more or less 3,000' of the material is packed within a containment crate from which it is deployed. The boom may be either manually or self-inflating and is characterized by a flotation chamber from which depends a solid curtain which terminates in a sea-filled ballast bag.

Figure 1:
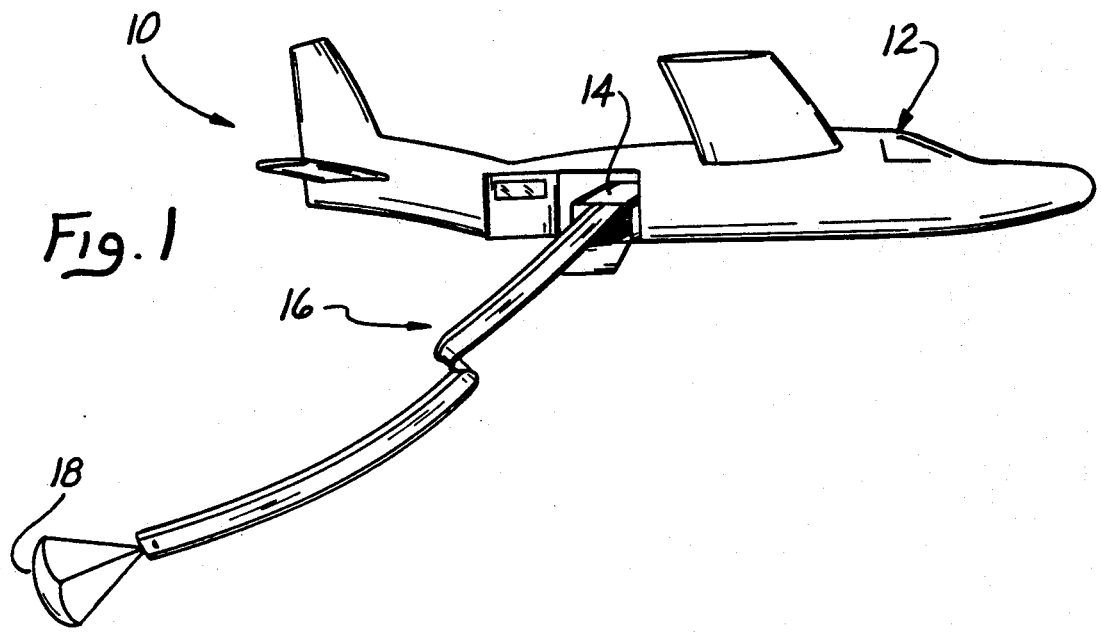
FIG. 1 is a simplified perspective depiction of deployment of the invention by aircraft or helicopter.
Figure 2:
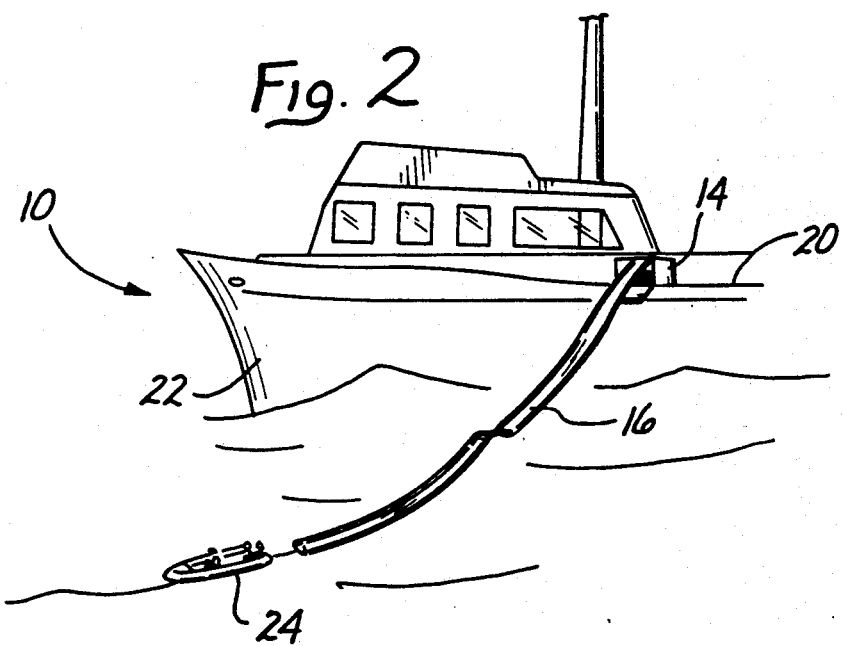
FIG. 2 is a simplified perspective view of deployment of the invention by a lightweight inflatable craft deploying the boom from its containment on the deck of a tanker.
Figure 3:
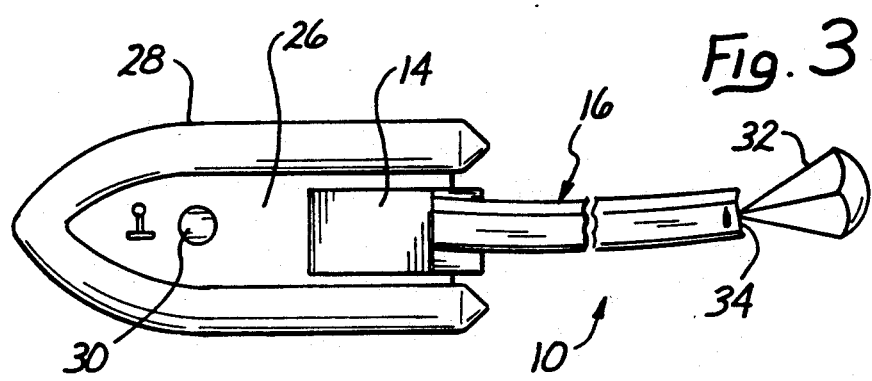
FIG. 3 is a top plan elevational view of a lightweight inflatable craft deploying the invention from its containment on the inflatable craft.

Before describing the construction of the boom system in greater detail, turn first to FIGS. 1–3, wherein deployment of the lightweight boom system is depicted. Since the entire boom system weighs on the average of less than 1 to 1.5 lbs/lineal ft., 3,000' of boom, including its containment and inflation devices, weighs of the order of 3,500 lbs. Because of its relatively light weight and compact storage, the boom system, generally denoted by reference numeral 10, can be carried and deployed from a conventional fixed wing aircraft 12, as depicted in FIG. 1. It is of course understood that deployment by helicopters or any type of aircraft is contemplated. Containment crate 14, the end of which is just shown in the end of aircraft 12, is opened and the boom curtain, generally denoted by reference numeral 16, is deployed by a means of a conventional drag chute 18. As will be described below, as boom curtain 16 is deployed, it inflates by compressed gas or by ram driven air through air scoops fitted with one-way valves (not shown) and tends to sail out from the aircraft drawn from containment crate 14 solely by the force provided by drag chute 18. Because of its light weight and large surface area, boom curtain 16 catches the wind and tends to "float on air" so that its entire length can be deployed, if desired, from aircraft 12 before any portion of boom curtain 16 is in contact with the water.

It is not necessary that boom system 10 be completely inflated before it settles onto the water surface or that it even be inflated at all. Again as described below, the inflation begins upon deployment and continues until fully inflated, which includes the scenario, although not preferred, wherein inflation may not begin until the boom curtain 16 is in the water and has sunk a number of feet below the surface. Inflation will in any event occur even underneath the water surface and raise boom curtain 16 into its operative position.

It is also expressly contemplated that air deployment of boom system 10 can be achieved equally well through rotary winged aircraft by means similar to that depicted in FIG. 1. Therefore, as used in the claims below, "aircraft" is broadly construed to include any type of fixed or rotary wing aircraft, now known or later devised.

FIG. 2 is a simplified perspective view of deployment of boom system 10 from deck 20 of tanker 22. Container 14 has, for example, been moved form a storage position on deck 20 to a deployment position at or near the rail. The end of container 14 has been opened and boom curtain 16 drawn therefrom by means of a lightweight inflatable raft 24. Inflatable raft 24 which may be manned by one or two seamen, can easily draw boom curtain 16 from containment 14 as it is self-inflates or is manually pumped. Gravity provides the principal part of the force necessary to draw boom curtain 16 from containment 14, and inflatable raft 24 only providing the force necessary to drag the inflating or inflated boom curtain 16 through the water around tanker 22. It is contemplated that the invention would be carried on deck of every vessel in which potential for chemical spills might occur together with the inflatable raft 24 powered by a conventional outboard. The aerial deployment of FIG. 1 would be employed where on-site emergency installation such as that shown in FIG. 2 was not available. Such aerial deployment could be delivered to virtually any point on the globe within a few hours flight time or less from air fields situated within reasonable air distance of the world's oil sea lanes.

FIG. 3 is a top elevational view of another mode of deployment of the invention wherein containment 14 is mounted directly on the rigid floor 26 of a conventional lightweight inflatable raft 28 powered by conventional outboard 30. Again only one or two persons are required to deploy boom curtain 16. In this instance, containment 14 is opened and boom curtain 16 is drawn form containment 14 by a conventional sea anchor 32 deployed from free end 34 of boom curtain 16. The forward motion of inflatable raft 28 in combination with the drag force of sea anchor 32 provides the force to deploy boom curtain 16 which 20 self-inflates or is manually pumped up as it is deployed as described below. The entire boom system 10, including inflatable raft 28, may be carried or aerially deployed as a unit, as for example from a helicopter. The actual deployment of boom curtain 16 then is effectuated entirely at sea level.

Figure 4:
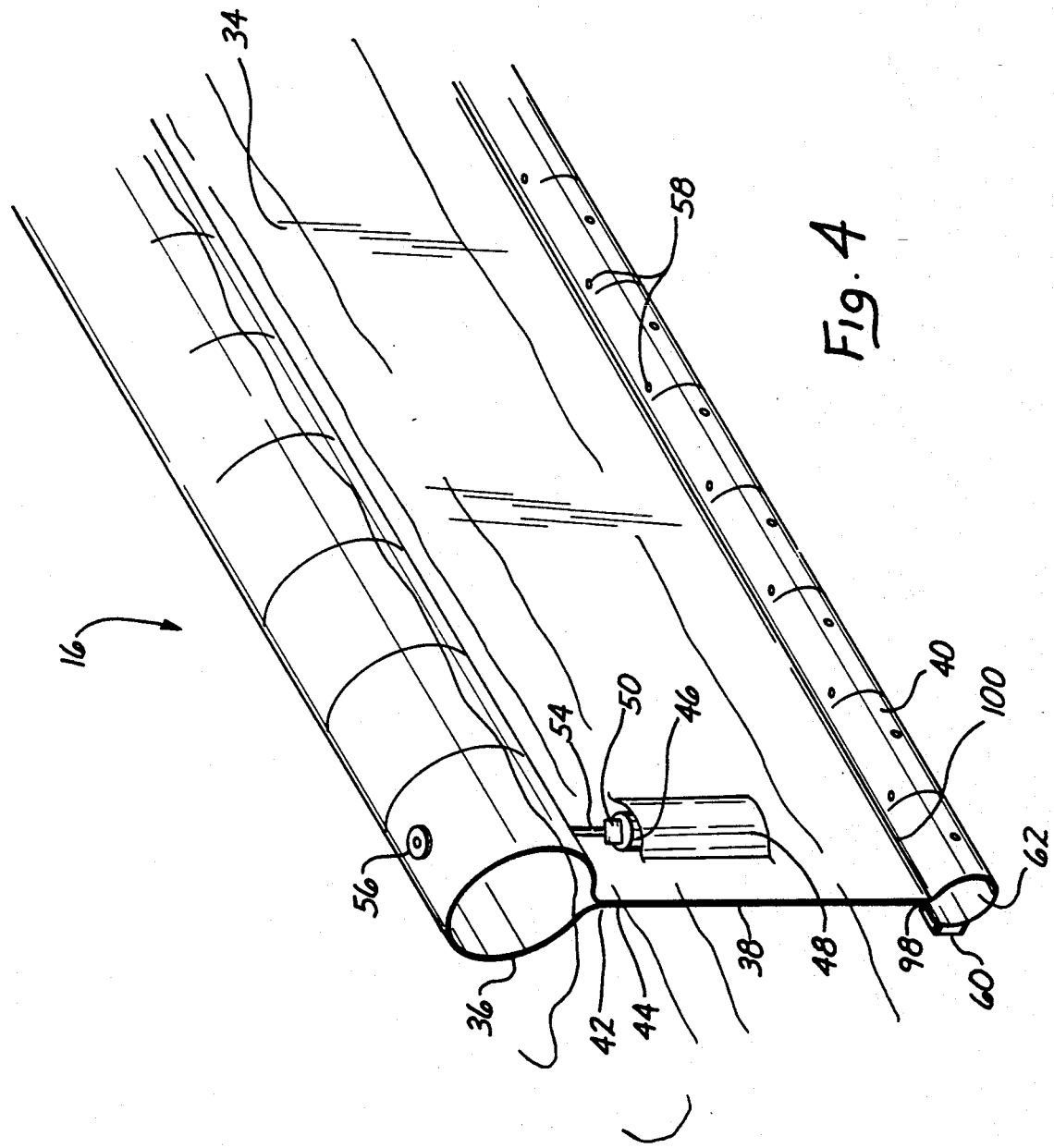
FIG. 4 is a perspective cutaway view of the boom as disposed in a sea.

Turn now to the cut away perspective view of FIG. 4 wherein a typical section of boom curtain 16 is shown as deployed in sea 34. Boom curtain 16 as previously stated is fabricated from single-ply or multiple-ply lightweight synthetic oil resistant sheet material to form an inflatable air chamber 36 from which depends a solid curtain 38 which terminates in a sea-filled ballast chamber 40. A chafe protection blanket (not shown) may be attached to curtain 38 to temporarily protect boom curtain 16 from abrasive or rough surfaces which may be found on the side of the ship from which it is deployed. Flotation chamber 36 is formed by forming a singular linear weld 42 between one edge 44 of a section of sheet material, which is folded over and laid back against that portion of the sheet material which will become the upper portion of curtain 38. Inflation chamber 36 in the preferred embodiment also includes periodic vertical welds (not shown) to section or divide chamber 36 into separate approximate 50' long air-tight compartments. Flotation chamber 36 is preferably self-inflated by means of a $CO_2$ or other gas cylinder or bottle 46 contained within a pocket 48 attached to curtain 38. $CO_2$ bottle 46 is conventional in construction and is provided with a valve 50 which is actuated by a pull-pin 52 not shown in FIG. 4, but depicted in FIG. 5. The compressed $CO_2$ or other gas is provided through a tube 54 to inflation chamber 36.

Because of the light weight of boom curtain 16 only approximately 1.0 lbs buoyancy/lineal foot are required to float curtain 16. Therefore the amount of gas and gas pressure required in order to inflate 50' chamber 36 is low, typically in the range of 0.25 psi or less.

Figure 5:
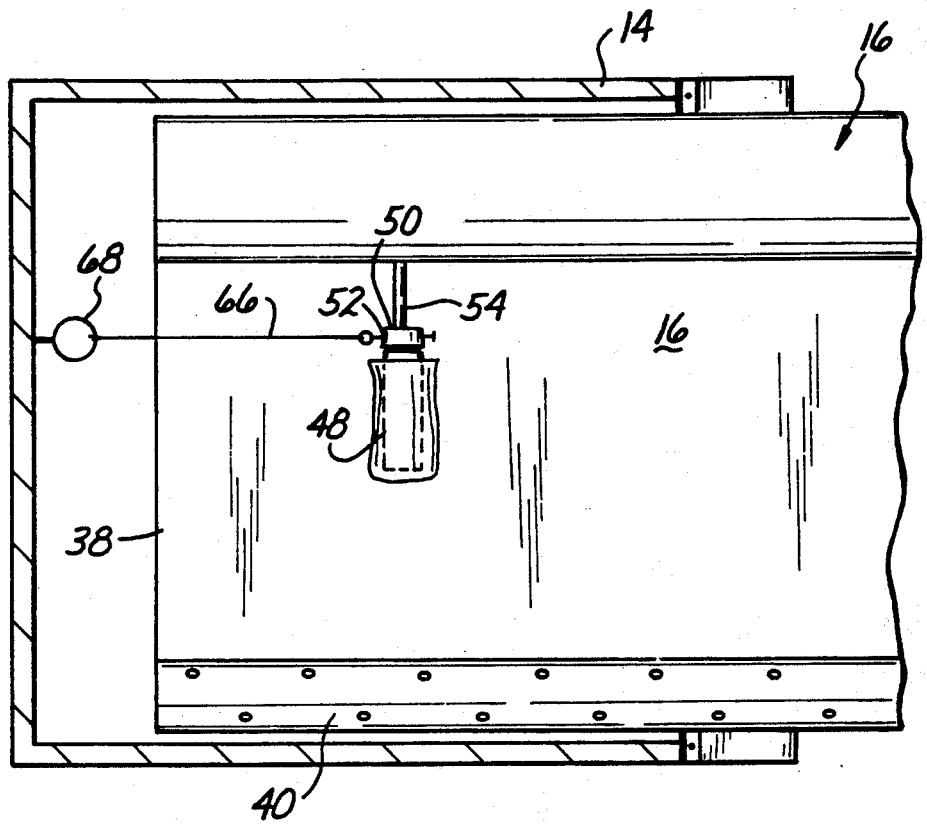
FIG. 5 is a horizontal cross-sectional view of the boom system as stored in within its containment crate.

If in any event pull-pin 52 of FIG. 5 should fail, pin 52 or alternatively valve 50 is so designed as to include a conventional water soluble link or trigger which will open valve 50 within a few minutes of immersion within sea water. Even in the unlikely event that neither pull-pin 52 nor the soluble link will trigger bottle 46, a manual quick fill air valve 56 is provided to allow the deployment personnel to inflate any inflatable section 36 which has for any reason failed to self-inflate. Manual inflation may be performed from inflatable raft 28 by means of a low pressure conventional manual or electric air-pump carried by the deployment personnel. Inexpensive electric or manual air pumps designed to run off 12 volt marine or auto batteries are readily available and provide enough volume and pressure to satisfactorily inflate any sections which would fail to self-inflate for any reason.

The same valve 56 is used as a quick deflation means the same electric portable air pump with the air pump simply reversed so that gas is pumped out of the flotation chambers to allow for deflation of the boom curtain.

Even if one or more chambers should fail to inflate or be inflated, the overall effectiveness of boom system 10 is not seriously jeopardized, since there is sufficient reserve buoyancy in each 50' section such that adjacent sections will nevertheless float an interlying uninflated section.

Valve 50 coupled to bottle 46 is designed to provide a controlled or restricted flow of $CO_2$ from bottle 46 to prevent excessive expansion cooling, which might thermally stress the material of delivery tube 54, inflation chamber 36, or create a temporary $CO_2$ line blockage. $CO_2$ bottle 46 typically contains approximate 40,000 in$^3$ of gas at normal atmospheric pressures and temperatures and is throttled or designed to inflate its corresponding approximate 50' inflation chamber 36, having a volume of approximately 60,000 in$^3$, within approximately 3 minutes.

As previously stated, there is no need for intermediate inflation since a substantial portion of a minute or several minutes may pass following the triggering of gas bottle 46 before boom curtain 16 is deployed in the sea. Even though the sea level deployment as shown in FIG. 3 is more immediate than by aerial or deck deployment, inflation after deployment in the sea within a few minutes of it actual deployment works no ill effect on the efficacy of oil boom system 10.

Ballast chamber 40 is provided with a plurality of holes 58 to allow the ingress and egress of sea water into ballast chamber 40. Ballast chamber 40 is periodically weighted down by means of ballast weights 60 attached along its edge or on curtain 38 just above ballast chamber 40. Alternatively, any of the means as shown in the prior art, including the disposition of chain through chamber 40 can be used.

In the preferred embodiment, ballast chamber 40 has disposed therein periodically along its longitudinal length a plurality of means 62 to expand or open chamber 40. Any means now known or later devised which can assists in the opening or ballooning of ballast chamber 40 may be employed. In the preferred embodiment, a water expandable plug or cylinder 62 is used. For example, plug 62 may be comprised of a flattened, dehydrated cylindrical plug having one or both ends attached to the interior side wall 64 of ballast chamber 40. When plug 62 is immersed in sea water, it hydrophillically absorbs sea water and expands to many times its length to force side wall 64 of ballast chamber 40 apart. This in turn draws the sea water into ballast chamber 40 through holes 58.

Alternatively, a water soluble tubing may be spirally fixed to inside wall 64 and led along the longitudinal length of ballast chamber 40. The tubing is similarly filled with a dehydrated hydrophyllic material which, when in contact with water, will swell and cause the tubing to become rigid, thereby providing a helical reinforced ribbing which will expand ballast chamber 48, and thereby suctioning the sea water into the ballast chamber through holes 58.

Still another embodiment of means 62 contemplates periodic placement of mechanical coil or leaf springs which are held in a flat and compressed configuration by a water soluble binding. The binding breaks upon contact with the sea water and mechanical expansion of the spring spreads side walls 64 and sucks in sea water through holes 58.

The general structure and inflation of flotation chamber 36 and ballast chamber 40 now having been generally described, turn now to the depictions of FIGS. 5-8 wherein the deployment and mechanical couplings used in connection with boom system 10 are descried. In FIG. 5 a horizontal cross-sectional view of containment 14 depicts the storage of curtain 16 within containment 14 in a series of horizontal accordion folds. FIG. 5 clearly illustrates that flotation chamber 36, curtain 38, and ballast chamber 40 are folded and laid out flatly. Pull pin 52 is clearly shown extending from valve 50 and is connected by means of a lightweight cable or line 66 to a coupling 68 fixed to the left wall of containment 14 as seen in FIG. 5. As boom curtain 16 is drawn to the right in FIG. 5 as it is deployed from containment 14, pull pin 52 will be withdrawn from valve 50 by means of cable 66 and its attachment through coupling 68 to containment 14, thereby initiating inflation of chamber 36.

Figure 6:
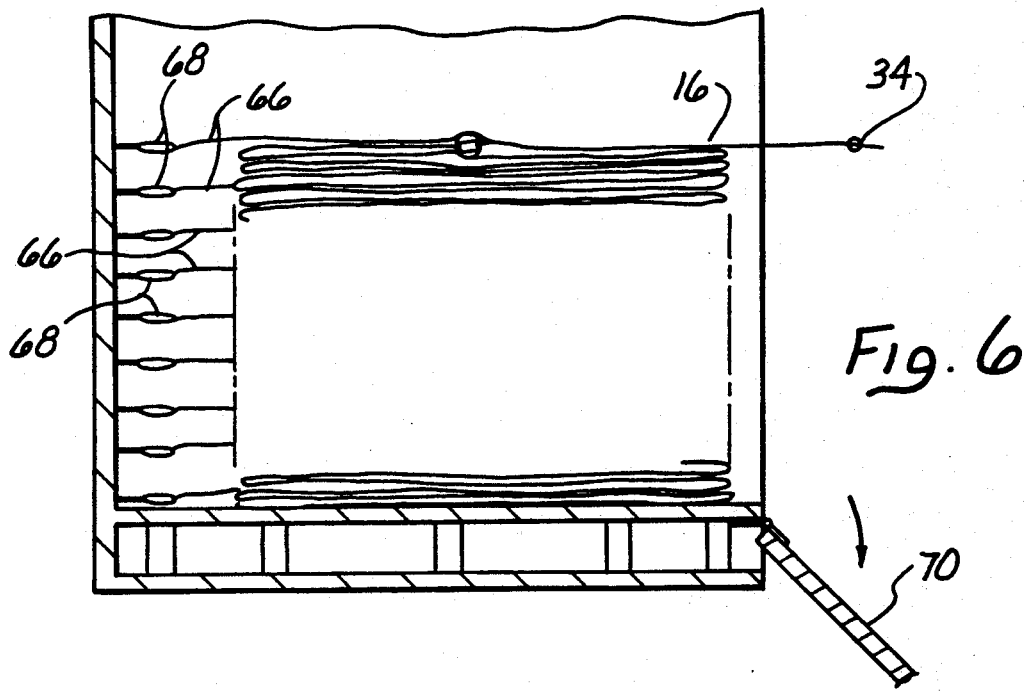
FIG. 6 is a vertical cross-sectional view of the boom system as stored within its containment crate and just being deployed therefrom.

A vertical sectional view of containment 14 is depicted in FIG. 6 which clearly shows the horizontal accordion folds of boom curtain 16 and the multiple attachments through coupling 68 and cables 66 to the left wall of containment 14 as seen in FIG. 6. The right wall of containment 14 is a hinged door 70 which is manually opened with free end 34 of curtain 16 being drawn from the top of the folded stack. In this way there is no weight tending to restrain or hold down a portion of boom curtain 16 which is being actively moved or withdrawn from containment 14 except for the friction and weight of that single fold of boom curtain 16 then being withdrawn.

In the preferred embodiment a section of up to 3,000' more or less of boom curtain 16 is stored and deployed from containment 14 which is appropriately 3' in height. The opposing end of boom curtain 16 is free and not fixed to containment 14 or may be tethered thereto by a line as desired.

Figure 7:
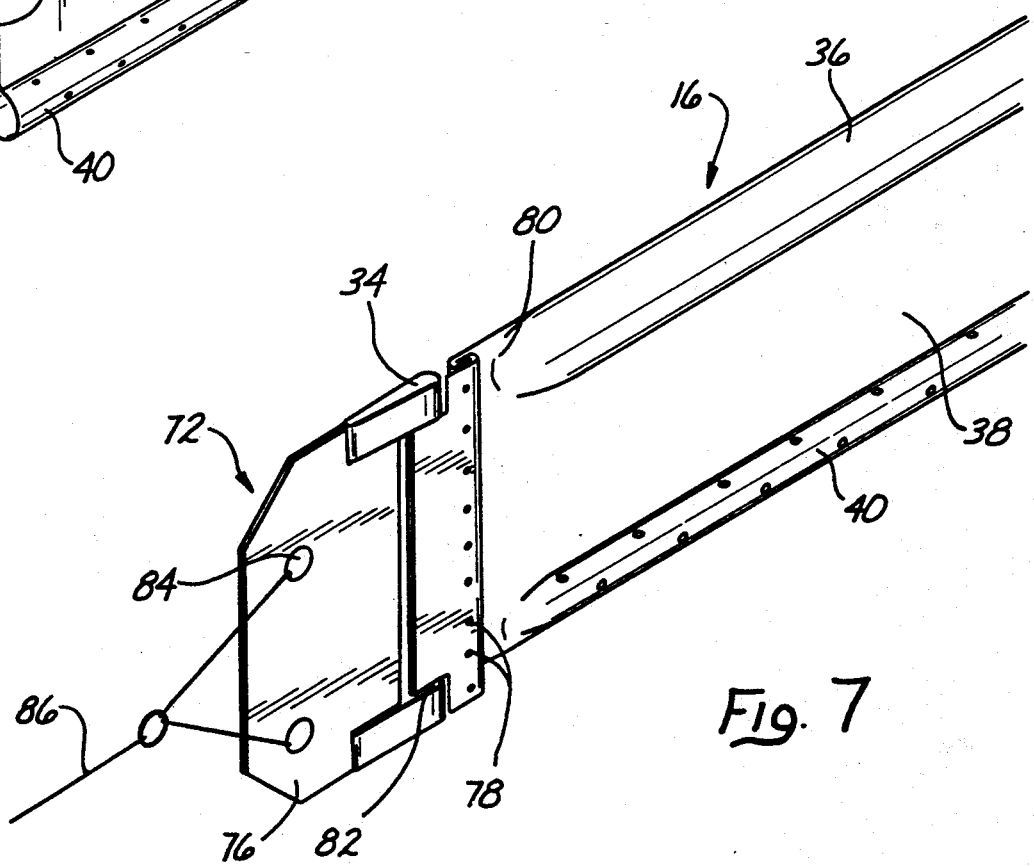
FIG. 7 is simplified side elevational view of the end of the boom showing a towing fixture.

The deployment scenarios of FIGS. 1-3 indicate in each case some means by which an end of boom curtain 16 is towed either by a drag chute, sea anchor or inflatable raft. FIG. 7 depicts a towing fixture generally denoted by reference numeral 72 which may be used in all three scenarios. The end of boom curtain 16, here shown for example as free end 34, is provided with a rigid reinforcing plate 74 to distribute the stress across the entire width of boom curtain 16 and provide a strong mechanical attachment for a towing plate 76. Reinforcing plate 74 may be folded around the end 34 of boom curtain 16 and then welded, glued, or bolted into boom curtain 16. A plurality of nylon through-bolts 78 are shown in the depiction of FIG. 7. The section of flotation chamber 16 closest to reinforcing plate 74 has an airtight weld 80 separating it from end 34 so that stresses or perforations made in the attachment of reinforcing plate 74 do not compromise the integrity of the adjacent inflation chamber 36.

Towing plate 76 is then coupled by any conventional means to reinforcing plate 74, such as by a pivoting tow bar combination 82 disposed through the loop defined by folded reinforcing plate 74 and captively held at its ends by towing plate 76. Towing plate 76 in turn is then provided with a coupling means, such as bridle pins 84 to which a towing cable 86 may be attached.

In the illustrated embodiment, sections of up to three thousand feet more or less are contemplated as being made in a single continuous and integral length of cross welded segments. Therefore, the entire length of boom curtain 16 stored within containment 14 is made of a single continuous piece. However, it is expressly contemplated that multiple sections of such lengths can be joined together by means of a coupling such as shown in perspective view in FIG. 8. In the illustrated embodiment, each end, opposing the towed end, such as shown in FIG. 7 is also provided with a coupling generally denoted by reference numeral 88. Coupling 88 is a rigid stainless steel or aluminum sheet which is fastened by conventional means, such as through bolting to the end of boom curtain 16. Boom curtain 16 is folded over double for additional strength and then attached to coupling 88 such as through a pressure plate 90 and a plurality of through bolts 92 affixing boom curtain 16 between pressure plate 90 and coupling plate 94. The opposing end of coupling plate 94 is formed into a rigid C-shaped clasp 96. Coupling 88 is then matched with an identically shaped coupling plate 88 on the next adjacent section of boom curtain 16. The two C-shaped clasps 96 of the two adjacent coupling plates 88 are substantially rigid and are engaged with each other by sliding C-shaped clasp 96 of one coupling plate 88 from top to bottom onto C-shaped clasp 96 of the adjacent coupling plate 88 or vice versa. The two coupling plates 88 are then secured to each other by a plurality of through bolts 98 or alternatively by means of resilient or bolted end clasps (not shown), which prevent the displacement of the two C-shaped clasps 96 with respect to each other.

Figure 8:
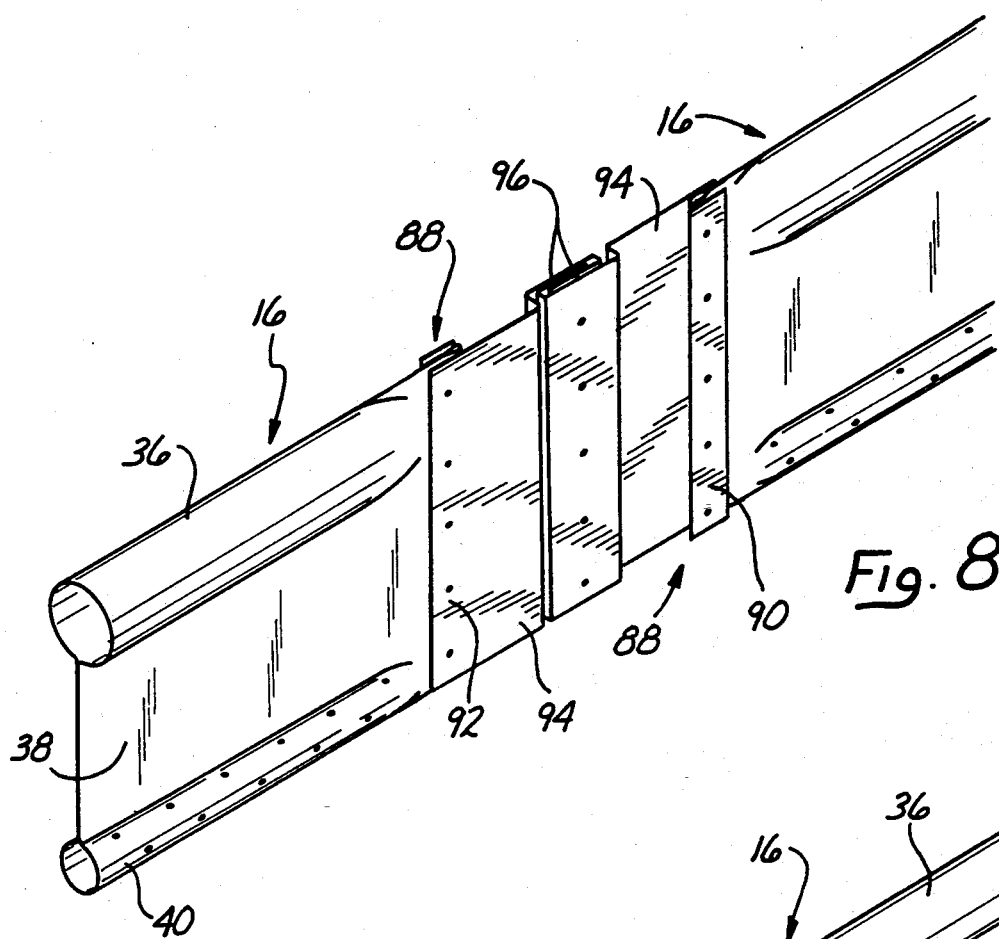
FIG. 8 is a perspective view showing a joint in the boom system.

In this way, the two sections of boom curtain 16 are locked together. The next end of the boom curtain 16 is then provided with an identical coupling 88 and so forth for as many additional sections as needed. As shown in FIG. 8, one C-shaped clasp 96 is oriented so that it can be connected to an opposing identically shaped C-shaped clasp 96. The orientation of clasp 96 at the opposing end of boom curtain 16 is reversed to play the same role with respect to the next segment that follows. A moment's reflection will reveal that it makes no difference whether the section of boom curtain 16 is reversed end-to-end or not, the orientation of clasp 96 of coupling 88 will always be correctly configured for clasp 96 of the adjoining section. Therefore during deployment no attention need be taken of which end is first or second as additional segments are deployed.

Many modifications and alterations may be made by those having ordinary skill in the art without departing from the spirit and scope of the invention. For example, although inflation means 62 to inflate ballast chamber 40 has been described in several embodiments, it is also contemplated that in addition to those embodiments or others which may be devised, that no means for generating a force to expand wall 64 of ballast chamber 40 may be required at all. Instead, interior wall 64 of ballast chamber 40 may be provided with a talcum powder or other releasing agent which will prevent wall 64 of ballast chamber 40 from becoming stuck together during prolonged storage. In addition the interior surface of wall 64 may be provided with an embossed texture which will also thereby reduce the tendency to adhere together. Still further, the upper fold or weld of ballast chamber 40 to curtain 38 is fabricated with a reversed bend 100. For example, the material which will form ballast chamber 48 is brought back toward a portion of the sheet material which will form the lower edge of curtain 38 and then bent back upon itself as shown in FIG. 4 to form a fold 100 below which weld 98 will be made. Construction of welds in this manner also helps to prevent adhesion of interior wall 64 and to allow for natural resiliency of the sheet material to inflate ballast chamber 40.

In addition it is contemplated that the ballast chamber may be provided with vertical pockets into which a weight or ballasting material may be inserted. It is also contemplated that the boom may be provided with an air scoop instead of or in combination with the drag chute to assist in the air deployment of the boom.

The illustrated embodiment is described in connection with deployment in salt water, but clearly fresh water deployment is also contemplated.

The illustrated invention is shown only by way of example and is not intended to limit the invention as defined the following claims. The claims are to be taken to include not only all elements which are literally within its scope, but all means and elements which are equivalent thereto for performing substantially the same function in substantially the same way to obtain substantially the same result whether now known or later devised.

We claim:

1. A marine containment system comprising:
   a boom curtain of a predetermined length formed from a single continuous flexible sheet comprising a lightweight flotation chamber extending to form a depending curtain and terminating in a sea-filled ballast chamber wherein said flotation chamber, depending curtain and ballast chamber are formed from a single ply of lightweight oil resistant sheet material, said predetermined length being defined as a length at least as long as that needed in a practical deployment of said boom curtain; and
   containment means for storing and deploying said boom curtain, said boom curtain being folded flatly within said containment means,
   whereby said marine containment system is lightweight, compact and readily deployed with a minimum of equipment and personnel.

2. The marine containment system of claim 1 wherein said ballast chamber is self-inflating with water.

3. The marine containment system of claim 2 wherein said self-inflating ballast chamber has an interior and comprises a plurality of holes defined in said ballast chamber for communicating said interior of said ballast chamber with exterior water environment, and means for displacing opposing side walls of said ballast chamber apart when said boom curtain is deployed in water.

4. The marine containment system of claim 1 further comprising means coupled to said boom curtain for deploying said boom curtain from aircraft.

5. The marine containment system of claim 1 further comprising means coupled to said boom curtain for deploying said boom curtain from ships.

6. The marine containment system of claim 1 further comprising means coupled to said boom curtain for deploying said boom curtain from a light small craft.

7. The marine containment system of claim 1 wherein said boom curtain is comprised of a plurality of segments of boom curtains and coupling means for coupling each of said segments together end-to-end, said coupling means being universal so that said segments may be coupled to each other end-to-end without preference to order of said ends of said segments.

8. The marine containment system of claim 1 further comprising means for rapid deflation of said flotation chamber of said boom curtain to allow recovery and refolding of said boom curtain within said containment means.

9. A marine containment system comprising:
   a boom curtain formed from a single continuous flexible sheet in lengths of 3000 feet or more comprising a lightweight flotation chamber extending to form a depending curtain and terminating in a sea-filled ballast chamber wherein said flotation chamber, depending curtain and ballast chamber are formed from a single ply of lightweight sheet material, said flotation chamber being segmented into a plurality of separate airtight chambers, each separate airtight chamber being separately inflated, said ballast chamber being self-inflating with water, said self-inflating ballast chamber having an interior and a plurality of holes defined in said ballast chamber for communicating said interior of said ballast chamber with exterior water environment, and comprising means for displacing opposing side walls of said ballast chamber apart when said boom curtain is deployed in water;
   containment means for storing and deploying said boom curtain, said boom curtain being folded flatly within said containment means, said boom curtain being flatly accordion folded within said containment means;
   inflation means for self-inflating said flotation chamber upon deployment of said boom curtain comprising a compressed gas assembly communicated with said flotation chamber and triggered upon deployment of said boom curtain from said containment means and an air valve adapted for inflation and deflation by an external air pump, said gas assembly comprising a valve, a compressed gas bottle, a pull pin to open said valve, and means for drawing said pull pin from said valve upon said deployment from said containment means:
   wherein said containment means is a rigid container and wherein said means for drawing said pin is a cable connected between said pull pin and said rigid container such that removal of said boom curtain from said container draws said pull pin from valve; and
   means coupled to said boom curtain for deploying said boom curtain from aircraft, ships or at sea level from light small craft,
   whereby said marine containment system is lightweight, compact and readily deployed with a minimum of equipment and personnel.

10. The marine containment system of claim 1 wherein said predetermined length is 3000 feet or more.

* * * * *